(12) United States Patent
Nakamizo et al.

(10) Patent No.: US 9,776,636 B2
(45) Date of Patent: Oct. 3, 2017

(54) GUIDANCE CONTROL SYSTEM FOR VEHICLE DRIVING OPERATION

(71) Applicant: HONDA MOTOR CO., LTD., Minato-ku, Tokyo (JP)

(72) Inventors: Yamato Nakamizo, Wako (JP); Tetsuya Kudo, Wako (JP); Toraki Iwamaru, Wako (JP); Satoshi Fukuoka, Wako (JP); Takao Fujiwara, Wako (JP); Masatoshi Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 14/867,115

(22) Filed: Sep. 28, 2015

(65) Prior Publication Data

US 2016/0090090 A1    Mar. 31, 2016

(30) Foreign Application Priority Data

Sep. 30, 2014  (JP) ................................ 2014-201329

(51) Int. Cl.
  *B60W 30/18*   (2012.01)
  *G01S 13/88*   (2006.01)
  *G05D 1/00*    (2006.01)

(52) U.S. Cl.
  CPC ............. *B60W 30/18* (2013.01); *G01S 13/88* (2013.01); *G05D 1/0055* (2013.01)

(58) Field of Classification Search
  None
  See application file for complete search history.

(56) References Cited

U.S. PATENT DOCUMENTS

| | | | | |
|---|---|---|---|---|
| 2002/0087254 A1* | 7/2002 | Ryoo | ........................ | B60T 7/12 701/93 |
| 2006/0190158 A1* | 8/2006 | Shiiba | ................ | B60K 31/0066 701/70 |
| 2009/0037062 A1* | 2/2009 | Lee | ..................... | B60W 30/045 701/70 |
| 2009/0187322 A1* | 7/2009 | Yasui | .................... | B60W 10/06 701/70 |

(Continued)

FOREIGN PATENT DOCUMENTS

| | | |
|---|---|---|
| JP | 5251889 B2 | 7/2013 |
| JP | 5407410 B2 | 2/2014 |

*Primary Examiner* — John R Olszewski
*Assistant Examiner* — James M McPherson
(74) *Attorney, Agent, or Firm* — Carrier Blackman & Associates, P.C.; Jospeh P. Carrier; Jingli Wang (57) ABSTRACT

A calculation method and apparatus for calculating a starting point for acceleration/deceleration operation of a vehicle with high accuracy using more input values while at the same time keeping calculation cost and time to a minimum is disclosed herein. An ECU making up a system calculates a start point for acceleration/deceleration operation of a vehicle on the basis of traveling condition information that changes as the vehicle travels and vehicle information that changes only slightly as a result of the travel of the vehicle. As a result, if the driver maintains a throttle operator at a given opening angle or more at a point before the start point, an actuator applies a force in the direction of closing a throttle valve to the throttle operator, thereby notifying the driver that the vehicle is close to the start point.

11 Claims, 6 Drawing Sheets

(56) References Cited

U.S. PATENT DOCUMENTS

| | | | |
|---|---|---|---|
| 2009/0319126 A1* | 12/2009 | Miyajima | B60K 31/0066 701/41 |
| 2014/0032072 A1* | 1/2014 | Yoshihama | B60T 7/18 701/70 |
| 2014/0222272 A1* | 8/2014 | Raste | B60T 8/1755 701/22 |
| 2015/0035666 A1* | 2/2015 | Scofield | G08G 1/0112 340/439 |
| 2015/0151725 A1* | 6/2015 | Clarke | B60W 30/00 701/28 |

* cited by examiner

GUIDANCE CONTROL SYSTEM FOR VEHICLE DRIVING OPERATION

BACKGROUND

The present disclosure relates to a guidance control system for vehicle driving operation that notifies, during acceleration of the vehicle by operating a throttle operator by a driver, the driver that the vehicle is close to a start point for acceleration/deceleration operation of the vehicle by applying a force in the direction of closing a throttle from an actuator to the throttle operator at a point before the start point.

Systems for assisting in the acceleration/deceleration operation of a vehicle by a driver have been disclosed in Japanese Patent No. 5251889 and Japanese Patent No. 5407410.

Japanese Patent No. 5251889 discloses assistance given in decelerating a vehicle by confirming the intention of a vehicle's driver to steer the wheel such as turning right or left and calculating the optimal deceleration start distance including the driver's operation history in the past. In this case, the driver's operation history, the current position of the vehicle acquired by the GPS (Global Positioning System) provided in the vehicle, information required for travel of the vehicle that is stored in the map information database available with the vehicle, and so on are combined to calculate, for example, the optimal deceleration start distance.

On the other hand, Japanese Patent No. 5407410 discloses guidance of acceleration/deceleration operation of a driving operator by a vehicle's driver, in particular, estimating a frictional coefficient between the vehicle's tires and the road surface and calculating a target vehicle speed and a target deceleration speed with high accuracy using the estimated frictional coefficient. In this case, it is necessary to continue with realtime calculation using a variety of parameters and sensor inputs to provide improved system accuracy.

SUMMARY

Increasing the number of such various parameters and sensor inputs to be used contributes to optimal and highly accurate calculation of information such as a point where the driver should start accelerating or decelerating the vehicle. This makes it possible to properly assist the driver in accelerating or decelerating the vehicle.

However, the technologies described in Japanese Patent No. 5251889 and Japanese Patent No. 5407410 require that calculations be made continuously while at the same time acquiring information in realtime, thus resulting in calculation cost and calculation time. This requires a calculation unit with high processing capabilities, thus leading to a high system cost as a whole.

In light of the foregoing, it is an object of the present disclosure to provide a guidance control system for vehicle driving operation capable of calculating a start point for acceleration/deceleration operation of a vehicle with high accuracy using more input values while at the same time keeping calculation cost and calculation time to a minimum.

A guidance control system for vehicle driving operation as disclosed herein includes: a throttle operator operated by a driver aboard a vehicle to control acceleration operation of the vehicle by the driver; an actuator mechanically connected to the throttle operator; and an electronic control unit as a controller adapted to calculate a start point for acceleration/deceleration operation of the vehicle, activate the actuator at a point before the start point along a direction of travel of the vehicle, and apply a force in a direction of closing a throttle from the actuator to the throttle operator so as to notify the driver that the vehicle is close to the start point. The guidance control system for vehicle driving operation has the following aspects.

In a first aspect of this disclosure, the electronic control unit calculates the start point on a basis of traveling condition information, i.e., realtime information that changes as the vehicle travels, and vehicle information to which is stored in advance because this information changes only slightly as a result of the travel. The electronic control unit activates the actuator if the driver maintains the throttle operator at a given opening angle or more at the point before the start point.

In a second aspect of this disclosure, the traveling condition information at least includes a speed of the vehicle detected by a vehicle speed sensor provided in the vehicle, road shape information acquired from an external information database or a vehicle-mounted camera provided in the vehicle, weather information acquired from the external information database, or position information of a different vehicle or an object present ahead in the direction of travel acquired from the external information database, the vehicle-mounted camera, or a millimeter wave radar provided in the vehicle. On the other hand, the vehicle information at least includes a weight of the vehicle, a weight of the driver, a service history of the vehicle, or tire specifications of the vehicle.

In a third aspect of this disclosure, the guidance control system for vehicle driving operation further includes various sensors adapted to detect the traveling condition information, and a network connection section that can connect to an external network. In this case, the electronic control unit controls the vehicle as a whole by performing given arithmetic operations. Further, the actuator, the sensors, and the network connection section are incorporated in the vehicle and connected to the electronic control unit.

In a fourth aspect of this disclosure, the guidance control system for vehicle driving operation further includes a memory section incorporated in the vehicle and connected to the electronic control unit to store at least the vehicle information.

In a fifth aspect of this disclosure, the electronic control unit acquires the vehicle information from the external information database via the network and the network connection section and stores the vehicle information in the memory section.

In a sixth aspect of this disclosure, the vehicle information is stored from an external memory writer to the memory section as the memory writer and the memory section are connected.

In a seventh aspect of this disclosure, the vehicle information stored in the memory section is transmitted from the memory section to an external information terminal via an external memory reader as the memory reader and the memory section are connected.

In a eighth aspect of this disclosure, the electronic control unit stores a traveling history of the vehicle in the memory section after the end of travel of the vehicle.

In a ninth aspect of this disclosure, the guidance control system for vehicle driving operation further includes an external memory reader that is incorporated in the vehicle and connected to the electronic control unit to acquire the vehicle information stored in an external memory.

In a tenth aspect of this disclosure, when the driver has his or her hand off the throttle operator, the actuator does not apply any force to the throttle operator.

In a eleventh aspect of this disclosure, the electronic control unit calculates a difference between a driving operation of the driver during travel of the vehicle and a driver's optimal driving operation and presents, to the driver, his or her driving skills on a basis of the difference after the end of travel of the vehicle.

According to the first aspect, a start point for acceleration/deceleration operation of a vehicle is calculated using traveling condition information and vehicle information. In this case, traveling condition information changes as the vehicle travels. As a result, it is necessary to continuously acquire this information in realtime. On the other hand, vehicle information changes only slightly as a result of travel of the vehicle. Therefore, vehicle information can be stored in advance as given data. This makes it possible to calculate the start point for acceleration/deceleration operation of the vehicle with high accuracy using various input values while at the same time keeping calculation cost and calculation time to a minimum.

As a result, if the driver maintains a throttle operator at a given opening angle or more at a point before the start point, an actuator applies a force in the direction of closing a throttle to the throttle operator, notifying the driver that the vehicle is close to the start point through tactile sensation and prompting the driver to proceed to the acceleration/deceleration operation.

According to the second aspect, information necessary for calculation of the start point for acceleration/deceleration operation is divided into two kinds, namely, traveling condition information that is acquired in realtime, and vehicle information that is stored in advance, thus minimizing calculation cost and calculation time.

According to the third aspect, the electronic control unit calculates the start point for acceleration/deceleration operation, thus making it easy to incorporate the guidance control system for vehicle driving operation in the vehicle.

According to the fourth aspect, the vehicle information is stored in a memory section. This allows the electronic control unit to read the vehicle information from the memory section one after another. As a result, the electronic control unit can calculate the start point for acceleration/deceleration operation without adversely affecting resources in the electronic control unit.

According to the fifth aspect, it is not necessary to physically connect, for example, a memory writer, making it possible to update the vehicle information stored in the memory section to the latest information.

According to the sixth aspect, the vehicle information stored in the memory section is rewritten to the appropriate information using the memory writer so that the electronic control unit can calculate the start point for acceleration/deceleration operation with higher accuracy.

According to the seventh aspect, the vehicle information stored in the memory section can be verified on an information terminal.

According to the eighth aspect, a traveling history of the vehicle is stored in the memory section, making it possible for the electronic control unit to use the traveling history stored in the memory section as input information for calculating the start point for acceleration/deceleration operation. As a result, the electronic control unit can calculate the start point for acceleration/deceleration operation tailored to the characteristics of the driver with high accuracy and prompt the driver to exercise proper caution.

According to the ninth aspect, the vehicle information stored in an external memory can be replaced (updated) with ease.

According to the tenth aspect, when the driver has his or her hand off the throttle operator, no force is applied to the throttle operator, thus minimizing the likelihood that operational sensation may change when the driver holds the throttle operator again for operation.

According to the eleventh aspect, the electronic control unit has a driving skill diagnosis function, thus making it possible to quantitatively present the driver's driving skills.

DETAILED DESCRIPTION

A detailed description will be given below of an exemplary approach to a guidance control system for vehicle driving operation with reference to the accompanying drawings.

Figure 1:
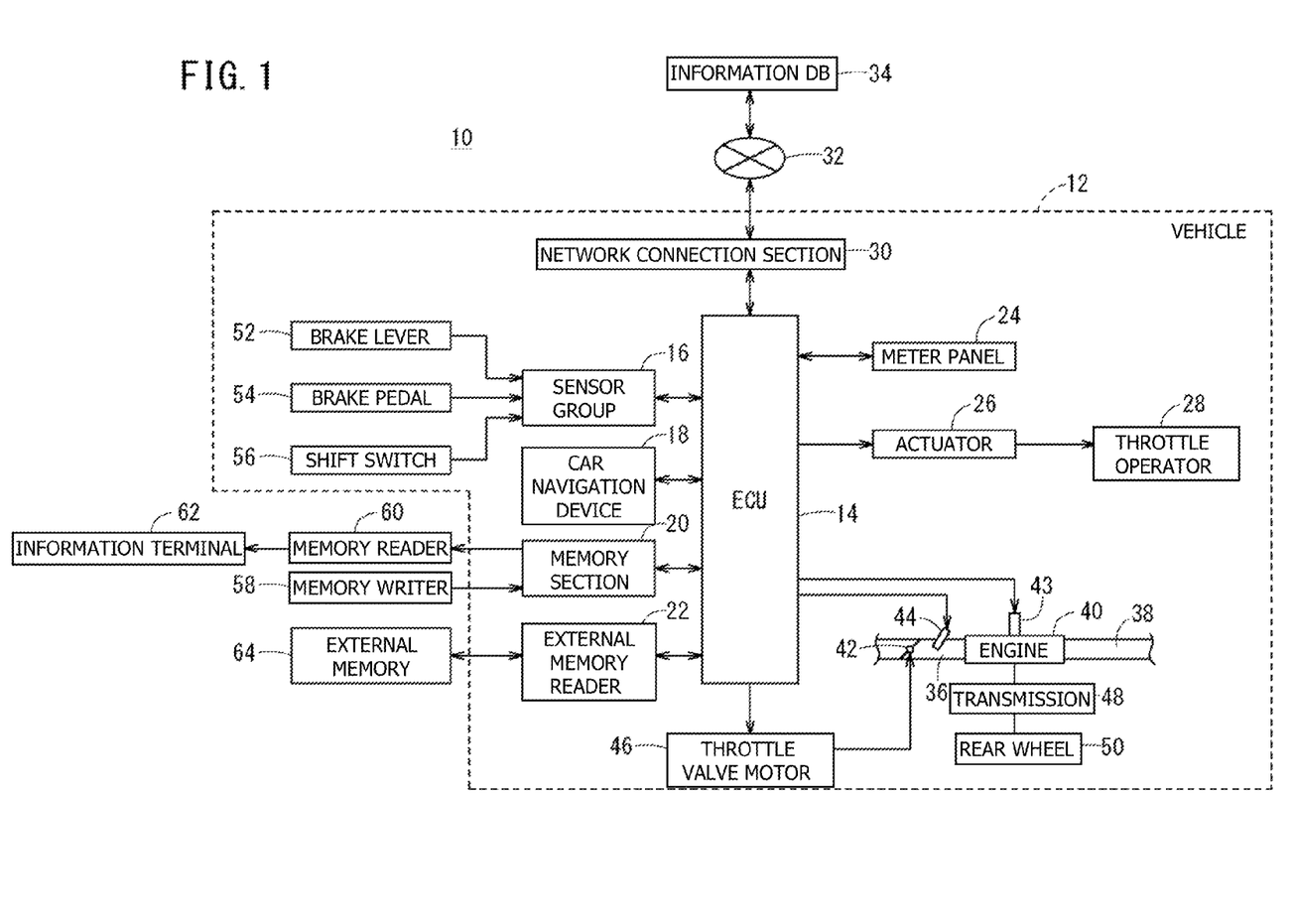
FIG. 1 is a block diagram of a guidance control system for vehicle driving operation.

FIG. 1 is a block diagram of a guidance control system for vehicle driving operation 10 according to the present exemplary approach (hereinafter referred to as the system 10. System 10 is incorporated in a vehicle 12. The vehicle 12 is one of a variety of vehicles such as two- or four-wheeled vehicles. The system 10 is applicable to a variety of vehicles. It should be noted that, in the description given below, a case will be described, as an example, in which the system 10 is incorporated in a two-wheeled motor vehicle as the vehicle 12.

System 10 has an ECU (electronic control unit) 14 as a controller adapted to control the vehicle 12 as a whole in a centralized manner. The ECU 14 is an electric unit including a computer and various electronic parts including at least a memory and a processor in which the memory is a non-transitory computer readable medium for storing data and computer instructions for controlling the processor. A sensor group 16, a car navigation device 18, a memory section 20, an external memory reader 22, a meter panel 24, and an actuator 26, are connected to the ECU 14. The sensor group 16 includes a variety of sensors shown in FIG. 2. The memory section 20 stores a variety of pieces of information shown in FIG. 3. The actuator 26 is mechanically connected to a throttle operator 28 such as a throttle grip held by a driver for performing acceleration operation of the vehicle 12. The memory section 20 is a non-transitory computer readable medium.

Further, the ECU 14 can acquire a variety of pieces of information disclosed by a third party (traveling condition information and vehicle information which will be described later) from an external information database 34 of the third party via a network connection section 30 and a network 32.

In this case, the information database 34 is a concept that includes a map information database, a weather information database, and a traffic information database. The map information database contains an accumulation of a variety of pieces of map information and road shapes. The weather information database contains an accumulation of a variety of pieces of weather information. The traffic information database contains an accumulation of traffic information and position information of other vehicles. Therefore, it is a matter of course that each of these databases may be connected to the network 32.

It should be noted that although shown as a single ECU in FIG. 1, the ECU 14 may include a plurality of ECUs (engine ECU and brake ECU) that are separated in terms of functionality. Further, an engine 40 is provided in the vehicle 12. The engine 40 has an intake pipe 36 and an exhaust pipe 38, with a throttle valve 42 provided in the intake pipe 36. The engine 40 has a spark plug 43 adapted to ignite a compressed fuel/air mixture. A fuel injection valve 44 is provided on an area of the intake pipe 36 close to the engine 40. The throttle valve 42 rotates as a throttle valve motor 46 is driven as a result of an operation performed by the driver to rotate the throttle operator 28. The output of the engine 40 is transmitted to a rear wheel 50 via a transmission 48, thus rotating and driving the rear wheel 50.

Figure 2:
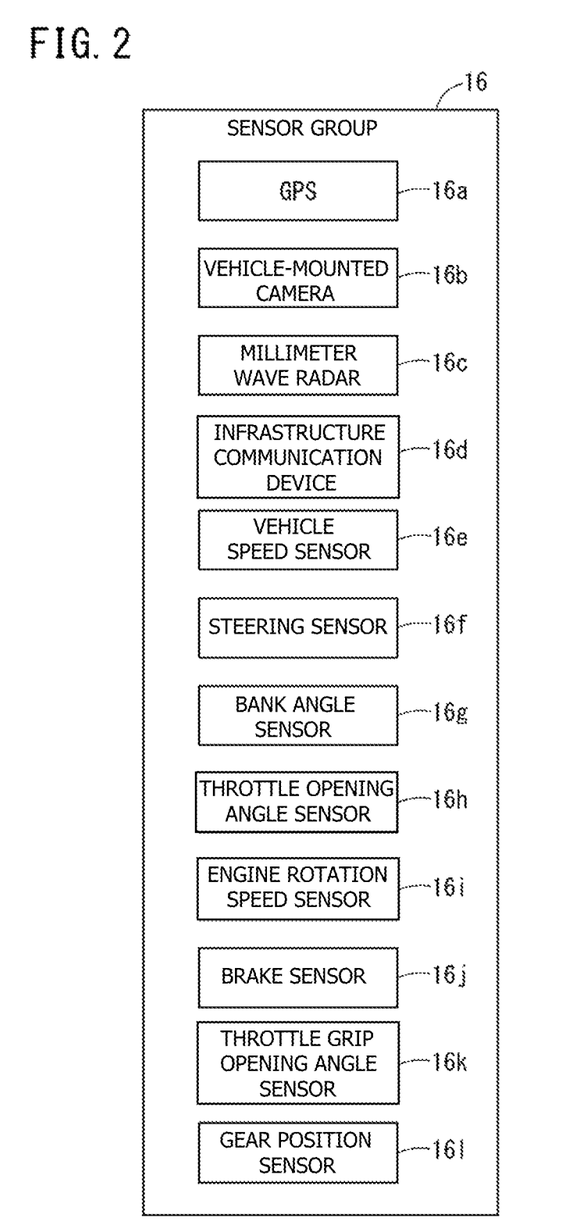
FIG. 2 is a block diagram illustrating a variety of sensors making up a sensor group shown in FIG. 1.

Here, a detailed description will be given of the components making up the system 10 incorporated in the vehicle 12. As illustrated in FIG. 2, the sensor group 16 includes a GPS 16a, a vehicle-mounted camera 16b, a millimeter wave radar 16c, an infrastructure communication device 16d, a vehicle speed sensor 16e, a steering sensor 16f, a bank angle sensor 16g, a throttle opening angle sensor 16h, an engine rotation speed sensor 16i, a brake sensor 16j, a throttle grip opening angle sensor 16k, and a gear position sensor 16l. Each of these sensors acquires information in realtime and outputs the acquired information to the ECU 14. That is, each of the sensors acquires traveling condition information, realtime information that changes as the vehicle 12 travels, at given intervals or continuously, outputting the acquired traveling condition information to the ECU 14 one after another. Further, FIG. 2 illustrates an example of the sensor group 16, though other sensors may be included. Alternatively, the sensor group 16 may include only some of the sensors shown in FIG. 2.

More specifically, each of the sensors making up the sensor group 16 acquires the following pieces of traveling condition information and outputs them to the ECU 14 one after another.

That is, the GPS 16a identifies the current position of the vehicle 12 by receiving a signal from a GPS satellite which is not shown, outputting a signal indicating the identified current position to the ECU 14. As for the road shape, map information, and road information, these pieces of information may be acquired by the GPS 16a rather than from the information database 34. Further, if road information and slope information indicating the bank angle are included in the map information acquired by the GPS 16a, the bank angle sensor 16g may be omitted.

The vehicle-mounted camera 16b primarily captures an image ahead of the vehicle 12 and outputs a signal indicating the captured image (image showing a road shape) to the ECU 14. The millimeter wave radar 16c emits a millimeter wave and receives radio waves reflected from a target (e.g., other vehicle or obstacle ahead), thus measuring the target position or the speed relative to the vehicle 12 on the basis, for example, of the millimeter wave propagation time or the frequency resulting from the Doppler effect and outputting a signal indicating the measured target position or the relative speed to the ECU 14.

The infrastructure communication device 16d acquires, for example, information relating to surrounding condition with poor visibility, traffic control information, and information relating to road condition (information about traffic accidents, traffic jams, and so on) via traffic infrastructure installed on roads such as optical vehicle detectors (optical beacons), outputting a signal indicating the acquired information to the ECU 14.

The vehicle speed sensor 16e detects, for example, the rotation speed of the output shaft of the engine 40 that is proportional to the vehicle speed, outputting a signal indicating the vehicle speed based on the detected rotation speed to the ECU 14. Further, the distance traveled by the vehicle 12 can be detected by integrating the vehicle speed detected by the vehicle speed sensor 16e with respect to time. In the exemplary approach disclosed herein, the traveled distance of the vehicle 12 may be included in traveling condition information.

The steering sensor 16f detects, for example, the extent to which the unshown handle is steered and the steering direction, outputting a signal indicating the detected extent of steering and the steering direction to the ECU 14. The bank angle sensor 16g detects the bank angle (inclination angle) of the vehicle 12, outputting a signal indicating the detected bank angle to the ECU 14. It should be noted that if the bank angle sensor 16g is provided, the steering sensor 16f can be omitted.

The throttle opening angle sensor 16h detects the opening angle of the throttle valve 42, outputting a signal indicating the detected opening angle to the ECU 14. The engine rotation speed sensor 16i detects the rotation speed of the output shaft of the engine 40, outputting a signal indicating the detected rotation speed to the ECU 14.

The brake sensor 16j detects the extent to which a brake lever 52, provided on the handle to activate a front wheel brake and apply a braking force to the front wheel, is operated, and the extent to which a brake pedal 54, used to activate a rear wheel brake and apply a braking force to the rear wheel 50, is operated, outputting a signal indicating each of the detected extents of operation to the ECU 14. The throttle grip opening angle sensor 16k detects the extent to which the throttle operator 28 is rotated, outputting a signal indicating the detected extent of rotation to the ECU 14.

The gear position sensor 16l detects the shift position selected by the driver by operating a shift switch 56, outputting a signal indicating the detected shift position to the ECU 14.

The car navigation device 18 has basic functionality to guide the vehicle 12 to a given destination and works in coordination with the ECU 14, the GPS 16a, the infrastructure communication device 16d, the meter panel 24, and the information database 34 to provide the driver with map information around the current position of the vehicle 12, the current position of the vehicle 12, the destination position, the route along the way, and so on. In this case, the car navigation device 18 acquires a variety of pieces of road information including course information about the route through which the vehicle 12 will pass, road surface information about the surfaces of the roads through which the vehicle 12 will pass, and wet information indicating the extent to which the road surfaces are wet. Further, if road information and slope information indicating the bank angle are included in the map information acquired by the car navigation device 18, the bank angle sensor 16g may be omitted. Therefore, the car navigation device 18 also acquires these pieces of information as traveling condition information of the vehicle 12 and outputs them to the ECU 14. It should be noted that the road information may include, for example, information about a curve 66 shown in FIG. 6 and information about a so-called S-shaped curve which consists of two gentle circular curve segments that are connected horizontally and alternately.

Figure 3:
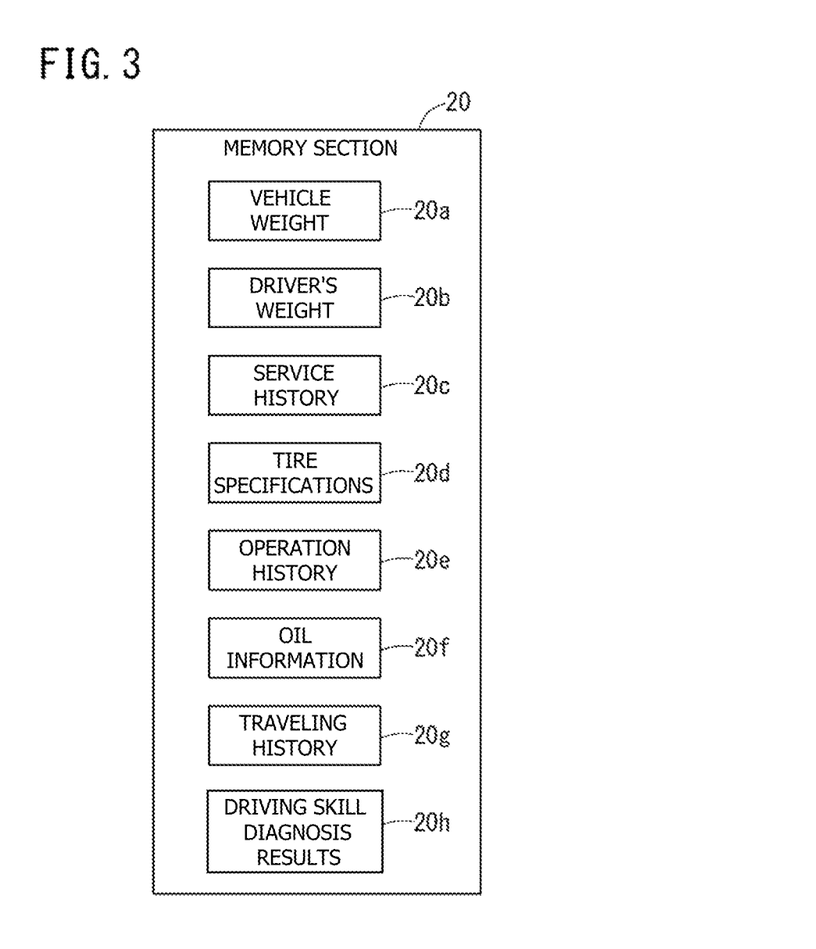
FIG. 3 is a block diagram illustrating a variety of pieces of information stored in a memory section shown in FIG. 1.

As illustrated in FIG. 3, on the other hand, the memory section 20 stores a vehicle weight 20a, a driver's weight 20b, a service history 20c, tire specifications 20d, an operation history 20e, oil information 20f, a traveling history 20g, and driving skill diagnosis results 20h. Each of these pieces of information is vehicle information which is stored in advance because this information changes only slightly as a result of the travel of the vehicle 12. That is, vehicle information can be stored in the memory section 20 inside the vehicle 12 in advance because this information changes only slightly as a result of the travel of the vehicle 12.

In this case, the above vehicle information is as follows. That is, the vehicle weight 20a is the overall weight of the vehicle 12. The driver's weight 20b is the weight of the driver alone or the total weight of all the passengers including the fellow passenger. The service history 20c is a past service history (e.g., number of days after oil change) of the vehicle 12. The tire specifications 20d include, for example, tire grip value and temperature coefficient. The oil information 20f indicates, for example, the level of engine oil degradation. The traveling history 20g includes, for example, the past traveling history of the vehicle 12 and the operation history of the driver driving the vehicle 12 (e.g., habits of the driver during acceleration/deceleration operation of the vehicle 12). The driving skill diagnosis results 20h are diagnosis results of the driving skills of the driver produced by the ECU 14 which will be described later.

These pieces of vehicle information are stored in advance in the memory section 20 before travel of the vehicle 12 as described above. On the other hand, these pieces of vehicle information are read, for example, by the ECU 14. A description will be given here of the manner in which vehicle information is stored in and read from the memory section 20.

First, the ECU 14 is connected to the information database 34 via the network connection section 30 and the network 32. Therefore, the ECU 14 acquires vehicle information from the information database 34 via the network 32 and the network connection section 30, storing the vehicle information in the memory section 20. Alternatively, an external memory writer 58 and the memory section 20 may be connected so that vehicle information is written from the memory writer 58 to the memory section 20 for storage.

Still alternatively, if already stored in the memory section 20, vehicle information in the memory section 20 may be rewritten for update with the information acquired from the information database 34 via the network 32 and the network connection section 30. Still alternatively, vehicle information in the memory section 20 may be overwritten with the information acquired from the external memory writer 58 for update.

Further, vehicle information stored in the memory section 20 may be read by the ECU 14 and displayed on a display panel of the meter panel 24 or the car navigation device 18. Still further, an external memory reader 60 may be connected to the memory section 20 so that the memory reader 60 reads the vehicle information and transmits the vehicle information to an information terminal 62 such as a personal computer or a logger.

In the above description, a case is described in which vehicle information is stored in the memory section 20. In the exemplary approach disclosed herein, however, vehicle information may be stored in an external memory 64, which is a non-transitory computer readable medium. In this case, the external memory reader 22 reads the vehicle information from the external memory 64 and outputs the information to the ECU 14 under control of the ECU 14.

In system 10, the ECU 14 controls, for example, not only the engine 40 but also the guidance of acceleration/deceleration operation of the vehicle 12 for the driver which will be described below. That is, the ECU 14 calculates a start point (e.g., a braking point P4 before the corner of the curve 66 in FIG. 6) for acceleration/deceleration operation of the throttle operator 28 by the driver on the basis of a variety of pieces of traveling condition information supplied from the sensor group 16 and a variety of pieces of vehicle information read from the memory section 20 or the external memory 64. The ECU 14 activates the actuator 26 if the driver maintains the throttle operator 28 at an opening angle equal to a given opening angle or more at a point (e.g., a point P1 in FIG. 6) before the calculated start point.

Figure 6:
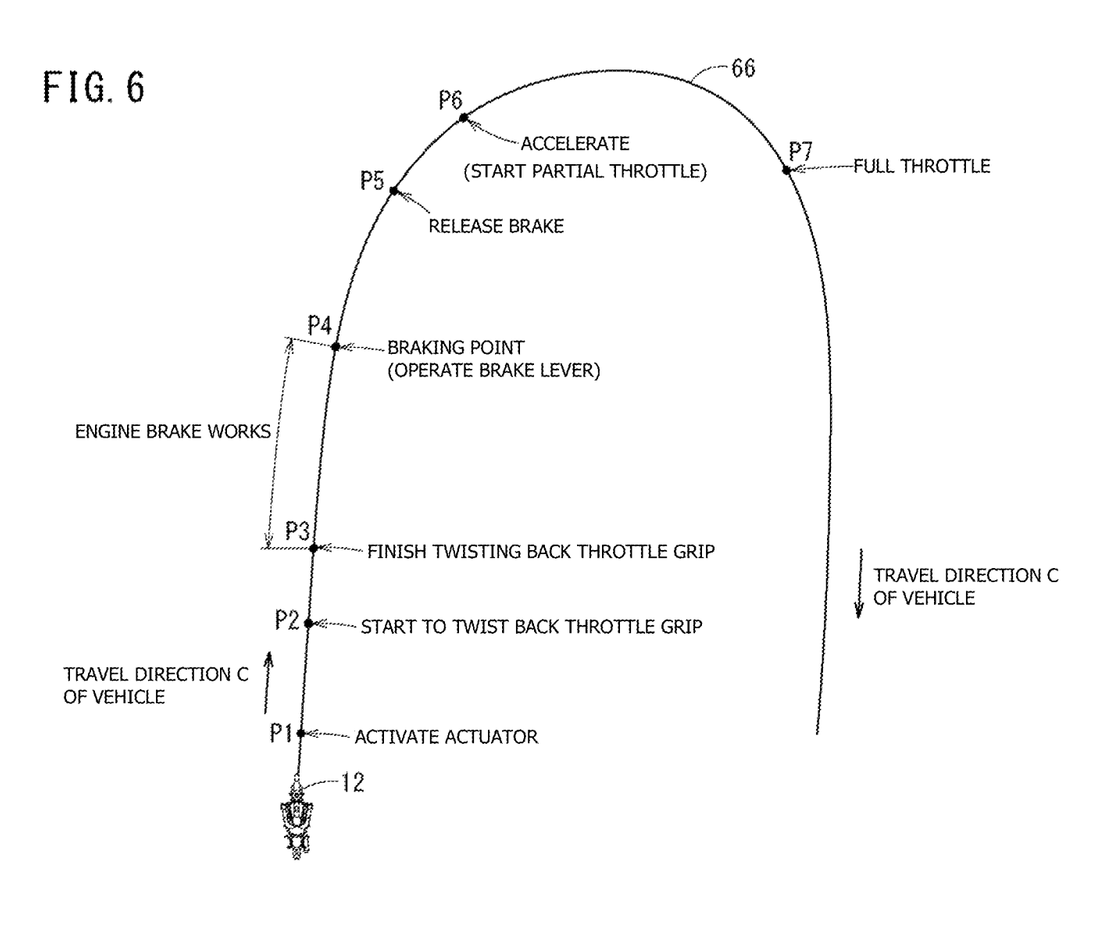
FIG. 6 is an explanatory diagram schematically illustrating guidance control handled by the guidance control system for vehicle driving operation when the vehicle shown in FIG. 1 enters a curve.

In this case, the ECU 14 activates the actuator 26 to apply a force in the direction of closing the throttle valve 42 (force in the direction of reducing the opening angle of the throttle valve 42) from the actuator 26 to the throttle operator 28, thus notifying the driver that the vehicle 12 is close to the start point through tactile sensation.

Further, if the vehicle 12 is a two-wheeled motor vehicle, the ECU 14 can prompt the driver to operate the brake lever 52 by activating the actuator 26 and vertically shaking the brake lever 52 near the throttle operator 28. Still further, the ECU 14 can prompt the driver to operate the brake pedal 54 by activating other actuator which is not shown and flipping up the brake pedal 54.

Still further, when the driver has his or her hand off the throttle operator 28, the ECU 14 may not activate the actuator 26 so that no force is applied to the throttle operator 28.

Still further, the ECU 14 may calculate a difference between the driving operation of the driver during travel of the vehicle 12 and the driver's optimal driving operation, presenting, to the driver, his or her driving skills (driving skill diagnosis results 20h) based on the difference after the end of travel of the vehicle 12. In this case, the ECU 14 need only display the driving skills on the display panel of the meter panel 24 or the car navigation device 18.

System 10 is configured as described above. A description will be given next of the operation thereof with reference to FIGS. 4 to 6. In this description of operation, FIGS. 1 to 3 will also be referred to as necessary for explanation.

A description will be given here of a method for acceleration/deceleration operation of the vehicle 12 by the driver when the vehicle 12, a two-wheeled motor vehicle, passes the curve 66. That is, the system 10 informs the driver of the desired manner in which the vehicle 12 should corner (information instructing that the vehicle 12 should decelerate) when the vehicle 12 corners through the curve 66, thus coaching the driver how to drive the vehicle 12 comfortably and pass the curve 66.

Figure 4:
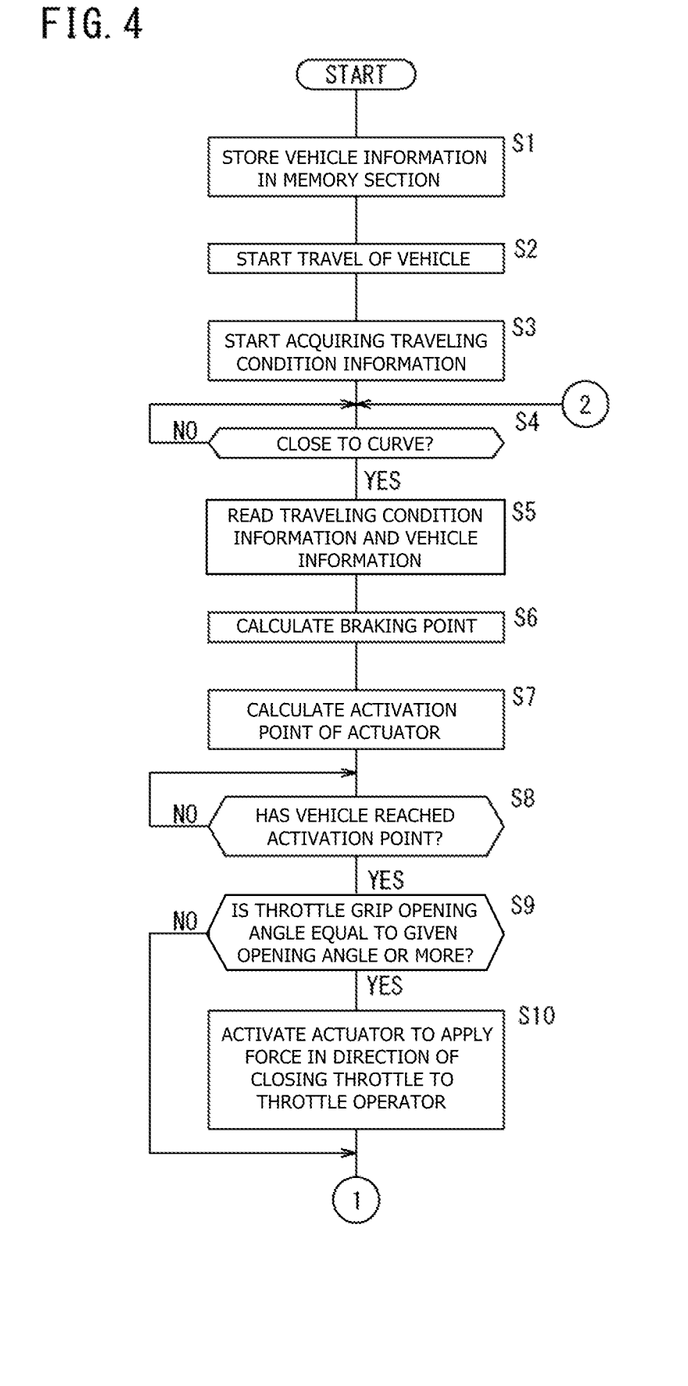
FIG. 4 is a flowchart illustrating an operation of the guidance control system for vehicle driving operation.

First, in step S1 of FIG. 4, vehicle information is stored in the memory section 20. In this case, for example, when the vehicle 12 is serviced at its dealer or service facility, a worker of the dealer or service facility need only connect the memory writer 58 to the memory section 20 and store vehicle information in the memory section 20 from the memory writer 58. Alternatively, if the display panel of the car navigation device 18 or the meter panel 24 is a touch panel, vehicle information may be stored in the memory section 20 by operating the touch panel and entering the vehicle information. Still alternatively, vehicle information may be acquired from the information database 34 via the network 32 and the network connection section 30 and stored in the memory section 20 by activating, for example, the ECU 14 of the vehicle 12.

For example, the vehicle weight 20*a* need only be written to the memory section 20 from the memory writer 58 or a touch panel while at the same time referring to the weight of the vehicle 12 given in the catalog of the vehicle 12.

The driver's weight 20*b*, on the other hand, may be written to the memory section 20 from the memory writer 58 or a touch panel by the driver himself or herself. Alternatively, it is only necessary to install, on the seat of the vehicle 12, a load sensor which is not shown and write the driver's weight detected by the load sensor to the memory section 20. Still alternatively, if the vehicle 12 is a tandem two-wheeled motor vehicle, there is likely to be a fellow passenger aboard the vehicle 12. Therefore, the weight twice the driver's weight may be written to the memory section 20 as the driver's weight 20*b*.

In next step S2, the driver rides on the vehicle 12 and starts the travel of the vehicle 12. In step S3, the sensors making up the sensor group 16 begin to acquire a variety of pieces of traveling condition information in realtime and start to output the acquired traveling condition information to the ECU 14. Further, the ECU 14 also acquires traveling condition information such as map information, traffic information, and weather information in realtime from the information database 34 via the network 32 and the network connection section 30.

In next step S4, the ECU 14 determines whether or not the vehicle 12 is approaching the curve 66 on the basis of traveling condition information such as the acquired map information, the current position of the vehicle 12, and the speed of the vehicle 12.

When determining that the vehicle 12 is not approaching the curve 66 (NO in step S4), the determination in step S4 is repeated. When determining that the vehicle 12 is approaching the curve 66 (YES in step S4), the ECU 14 not only acquires current traveling condition information from the sensor group 16 and the information database 34 via the network 32 and the network connection section 30 but also reads vehicle information from the memory section 20 in step S5. As a result, the ECU 14 calculates, in step S6, the braking point P4 before the corner of the curve 66 through which the vehicle 12 will pass, i.e., the point P4 where the driver should begin to operate the brake lever 52.

In next step S7, the ECU 14 calculates the point P1 where the actuator 26 is activated. It should be noted that the point P1 is a point before the point P4 in a direction of travel C of the vehicle 12. Further, the ECU 14 may change the calculated point P1 as appropriate in accordance with wet information and the traveling history 20*g*.

Then, if it is determined in step S8 that the vehicle 12 has not reached the point P1 yet (NO in step S8), the determination in step S8 is repeated. If the vehicle 12 has reached the point P1 (YES in step S8), the ECU 14 determines whether or not the throttle grip opening angle, the opening angle of the throttle operator 28 held by the driver, is equal to a given opening angle or more. More specifically, the ECU 14 determines whether or not the throttle grip opening angle detected by the throttle grip opening angle sensor 16*k* is equal to a given opening angle or more. Alternatively, because the throttle opening angle of the throttle valve 42 reflects the throttle grip opening angle, the ECU 14 may determine whether or not the throttle opening angle detected by the throttle opening angle sensor 16*h* is equal to a given opening angle or more.

Then, if the throttle grip opening angle (or throttle opening angle) is equal to the given opening angle or more (YES in step S9), the ECU 14 activates the actuator 26 in next step 10, thus applying a force in the direction of closing the throttle valve 42 from the actuator 26 to the throttle operator 28. This allows the driver holding the throttle operator 28 in the direction of opening the throttle valve 42 to be aware through tactile sensation that a force is applied in the direction of closing the throttle valve 42 to the throttle operator 28.

Figure 5:
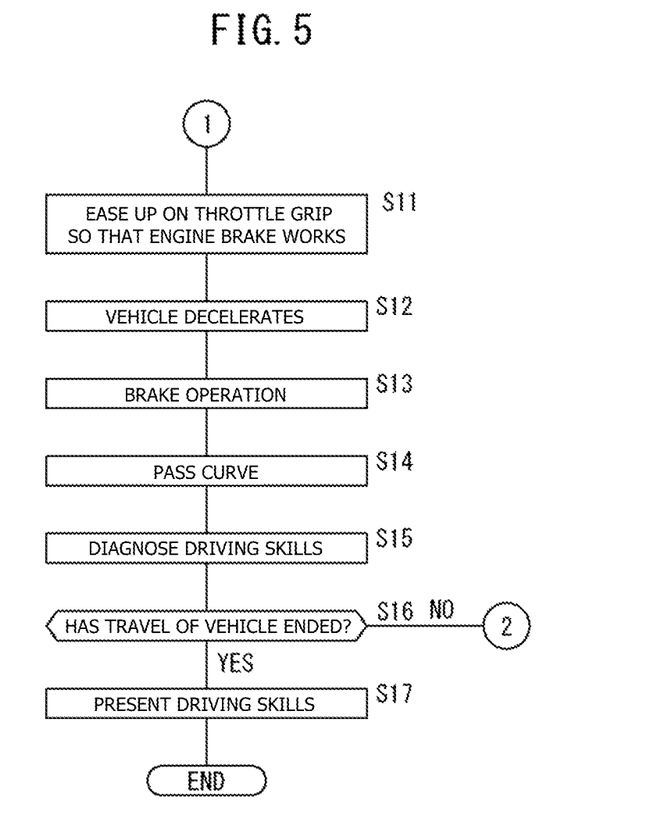
FIG. 5 is a flowchart illustrating the operation of the guidance control system for vehicle driving operation.

As a result, when the driver begins to ease up on the gripping state of the throttle operator 28 at a point P2 and twist the throttle operator 28 back to its original rotational angle (e.g., rotational angle before the start of the travel of the vehicle 12) at a point P3 in step S11 of FIG. 5, the engine brake begins to work on the vehicle 12 from the point P3. This causes the vehicle 12 to decelerate due to the engine brake in step S12. It should be noted that, in step S9 described above, the process in step S10 is omitted if the throttle grip opening angle (or throttle opening angle) is less than the given opening angle (NO in step S9).

In next step S13, the ECU 14 activates the actuator 26 at the point P4, thus vertically shaking the brake lever 52 near the throttle operator 28. This makes it possible for the ECU 14 to prompt the driver to operate the brake lever 52. As a result, if the driver operates the brake lever 52, the vehicle 12 will decelerate further.

Further, the ECU 14 flips up the brake pedal 54 by activating other actuator. This makes it possible for the ECU 14 to prompt the driver to operate the brake pedal 54. As a result, if the driver operates the brake pedal 54, the vehicle 12 will decelerate further.

Later, the brake lever 52 and the brake pedal 54 are eased up at a point P5, and partial throttle operation is started at a point P6. This allows the vehicle 12 to pass through the curve 66 with ease (step S14). Then, the driver operates the throttle operator 28 in the direction of opening the throttle valve 42 at a point P7, passing through the curve 66 at full throttle.

In next step S15, the ECU 14 diagnoses the driving skills of the driver during passage through the curve 66. More specifically, the ECU 14 calculates the difference between the driving operation of the vehicle 12 by the driver during passage through the curve 66 and the driver's optimal driving operation on the basis of information such as traveling condition information and vehicle information described above. The driving skill diagnosis results 20*h*, driving skills of the driver based on the calculated difference, are stored in the memory section 20.

If the travel of the vehicle 12 does not end in step S16 (NO in step S16), the processes of steps S4 to S16 are performed again. On the other hand, when the travel of the vehicle 12 ends in step S16 (YES in step S16), the ECU 14 reads the driving skill diagnosis results 20*h* from the memory section 20 and displays the read driving skill diagnosis results 20*h* on the display panel of the meter panel 24 or the car navigation device 18 in next step S17. For example, "The score of your driving today is 80 points out of 100" appears as the driving skill diagnosis results 20*h* of the driver on the display panel.

It should be noted that no information about acceleration/deceleration operation of the vehicle 12 appears on the display panel of the meter panel 24 or the car navigation device 18 during travel of the vehicle 12 in steps S2 to S16. The reason for this is that if the vehicle 12 is a two-wheeled motor vehicle, there is a likelihood that the driver may not look at the display panel of the meter panel 24 or the car navigation device 18 during travel of the vehicle 12.

As described above, system 10 calculates a start point for acceleration/deceleration operation of the vehicle 12 (e.g., braking point P4) using traveling condition information and vehicle information. In this case, traveling condition information changes as a result of travel of the vehicle 12. It is thus necessary to continuously acquire this information in realtime. On the other hand, vehicle information changes only slightly as a result of travel of the vehicle 12. Therefore, this information can be stored in advance as given data. This makes it possible to calculate a start point for acceleration/deceleration operation of the vehicle 12 with high accuracy by keeping calculation cost and time to a minimum while at the same time using a variety of input values.

If the vehicle 12 is a two-wheeled motor vehicle, there is a limitation in size of the system 10 incorporated in the vehicle 12. In the exemplary approach disclosed herein, therefore, if the system 10 is applied to a two-wheeled motor vehicle, it is possible to effectively minimize calculation cost and time.

Then, in the exemplary approach disclosed herein, if the driver maintains the throttle operator 28 at an opening angle equal to a given opening angle or more at the point P1 before the start point (point P4), the actuator 26 applies a force in the direction of closing the throttle valve 42 to the throttle operator 28, notifying the driver that the vehicle 12 is close to the point P4 through tactile sensation and prompting the driver to proceed to the acceleration/deceleration operation.

Normally, the vehicle 12 can be accelerated or decelerated by directly changing the engine rotation speed. However, if the engine rotation speed alone is directly changed when the throttle operator 28 is maintained at a given opening angle by the driver, there is a likelihood that the driver may feel a sense of discomfort out of thinking that the engine rotation speed is diminishing despite the fact that he or she maintains the throttle operator 28 at a given opening angle. For this reason, in the exemplary approach disclosed herein, the ECU 14 informs the driver of the desired manner in which the vehicle 12 should be driven in the form of a counterforce applied to the throttle operator 28 via the actuator 26, thus prompting the driver to perform proper driving operation.

Further, as described above, information necessary for calculation of a start point (point P4) for acceleration/deceleration operation is divided into two kinds, namely, traveling condition information, i.e., information that is acquired in realtime, and vehicle information that is stored in advance, thus minimizing calculation cost and calculation time.

Still further, because the ECU 14 is used as a controller adapted to calculate the point P4, the system 10 can be readily incorporated in the vehicle 12. Still further, vehicle information is stored in the memory section 20, thus allowing the ECU 14 to read the vehicle information from the memory section 20 one after another. As a result, the ECU 14 can calculate the point P4 without adversely affecting resources in the ECU 14.

Still further, vehicle information is stored in the memory section 20 from the information database 34 via the network 32 and the network connection section 30, thus eliminating the need to physically connect, for example, the memory writer 58 and updating the vehicle information stored in the memory section 20 to the latest one.

On the other hand, the vehicle information stored in the memory section 20 is rewritten to the appropriate information using the memory writer 58, thus allowing the ECU 14 to calculate the point P4 with higher accuracy.

Further, the vehicle information is read from the memory section 20 using the memory reader 60 and transmitted to the information terminal 62, thus allowing the vehicle information to be verified on the information terminal 62.

Still further, the traveling history 20g of the vehicle 12 is stored in the memory section 20, thus making it possible for the ECU 14 to use the traveling history 20g stored in the memory section 20 as input information for calculating the point P4. As a result, the ECU 14 can calculate the point P4 with high accuracy and prompt the driver to exercise proper caution in accordance with the characteristics of the driver.

Still further, the vehicle information is stored in the external memory 64 and read to the ECU 14 via the external memory reader 22, thus allowing the vehicle information stored in the external memory 64 to be replaced (updated) with ease.

Still further, when the driver has his or her hand off the throttle operator 28, no force is applied from the actuator 26 to the throttle operator 28, thus minimizing the likelihood that operational sensation may change when the driver holds the throttle operator 28 again for operation.

The ECU 14 has a function to diagnose the driver's driving skills, thus making it possible to quantitatively present the driving skills of the driver.

A description has been given above of the present disclosure with reference to an exemplary approach. However, the technical scope of the present disclosure is not limited to the scope described in the above approach. It is apparent to those skilled in the art that various changes and modifications can be made to the above approach. It is apparent from the scope of the claims that the technical scope of the present disclosure also includes other approaches with such changes or modifications. On the other hand, the reference symbols in round brackets appearing in the scope of the claims have been added to imitate the symbols given in the accompanying drawings for easy understanding of the present disclosure. The present disclosure is not to be interpreted as being limited to the elements with the reference symbols.

The invention claimed is:

1. A guidance control system for vehicle driving operation comprising:
   a throttle operator which a driver aboard a vehicle operates to control acceleration operation of the vehicle by the driver;
   an actuator mechanically connected to the throttle operator; and
   an electronic control unit as a controller adapted to calculate a start point for deceleration operation of the vehicle, activate the actuator at a point before the start point along a direction of travel of the vehicle, and apply a force in a direction of closing a throttle from the actuator to the throttle operator so as to notify the driver that the vehicle is close to the start point,
   wherein the electronic control unit calculates the start point based on traveling condition information, which is real time information that changes as the vehicle travels, and vehicle information, which is stored in advance,
   and wherein the electronic control unit activates the actuator if the driver maintains the throttle operator at a given opening angle or more at the point before the start point.

2. The guidance control system for vehicle driving operation of claim 1, wherein the traveling condition information includes
a speed of the vehicle detected by a vehicle speed sensor provided in the vehicle,
road shape information acquired from an external information database or a vehicle-mounted camera provided in the vehicle,
weather information acquired from the external information database, or
position information of a different vehicle or an object present ahead in the direction of travel acquired from the external information database, the vehicle-mounted camera, or a millimeter wave radar provided in the vehicle, and
the vehicle information at least includes
a weight of the vehicle,
a weight of the driver,
a service history of the vehicle, or
tire specifications of the vehicle.

3. The guidance control system for vehicle driving operation of claim 1, further comprising:
a plurality of sensors adapted to detect the traveling condition information; and
a network connection section that can connect to an external network,
wherein the electronic control unit controls the vehicle as a whole by performing given arithmetic operations, and
wherein the actuator, the plurality of sensors, and the network connection section are incorporated in the vehicle and connected to the electronic control unit.

4. The guidance control system for vehicle driving operation of claim 3, further comprising a memory section incorporated in the vehicle and connected to the electronic control unit to store at least the vehicle information.

5. The guidance control system for vehicle driving operation of claim 2, wherein the electronic control unit acquires the vehicle information from the external information database via the external network and the network connection section and stores the vehicle information in the memory section.

6. The guidance control system for vehicle driving operation of claim 4, wherein the vehicle information is stored from an external memory writer to the memory section as the memory writer and the memory section are connected.

7. The guidance control system for vehicle driving operation of claim 4, wherein the vehicle information stored in the memory section is transmitted from the memory section to an external information terminal via an external memory reader as the memory reader and the memory section are connected.

8. The guidance control system for vehicle driving operation of claim 4, wherein the electronic control unit stores a traveling history of the vehicle in the memory section after an end of travel of the vehicle.

9. The guidance control system for vehicle driving operation of claim 3, further comprising an external memory reader that is incorporated in the vehicle and connected to the electronic control unit to acquire the vehicle information stored in an external memory.

10. The guidance control system for vehicle driving operation of claim 1, wherein when the driver is not engaging the throttle operator, the electronic control unit does not activate the actuator to apply any force to the throttle operator.

11. The guidance control system for vehicle driving operation of claim 1, wherein the electronic control unit calculates a difference between a driving operation of the driver during travel of the vehicle and a driver's optimal driving operation and presents, to the driver, his or her driving skills based on the difference after an end of travel of the vehicle.

* * * * *